United States Patent
Nakamura et al.

(10) Patent No.: US 12,549,832 B2
(45) Date of Patent: Feb. 10, 2026

(54) READING DEVICE, IMAGE PROCESSING APPARATUS, AND READING METHOD

(71) Applicants: Shogo Nakamura, Kanagawa (JP); Makoto Nakamura, Kanagawa (JP)

(72) Inventors: Shogo Nakamura, Kanagawa (JP); Makoto Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/938,298

(22) Filed: Nov. 6, 2024

(65) Prior Publication Data

US 2025/0159315 A1    May 15, 2025

(30) Foreign Application Priority Data

Nov. 15, 2023 (JP) ................... 2023-194217

(51) Int. Cl.
*H04N 23/11* (2023.01)
*G06T 7/13* (2017.01)
*G06V 10/44* (2022.01)

(52) U.S. Cl.
CPC ............ *H04N 23/11* (2023.01); *G06T 7/13* (2017.01); *G06V 10/44* (2022.01)

(58) Field of Classification Search
CPC ........... H04N 23/11; G06T 7/13; G06V 10/44
See application file for complete search history.

(56) References Cited

U.S. PATENT DOCUMENTS

| 2006/0072171 A1* | 4/2006 | Nystrom | H04N 1/00702 358/514 |
| 2021/0281712 A1* | 9/2021 | Nakamura | H04N 1/00737 |
| 2022/0109769 A1* | 4/2022 | Ishikura | H04N 1/00734 |

FOREIGN PATENT DOCUMENTS

| JP | H08-139848 A | 5/1996 |
| JP | 2014-053739 A | 3/2014 |
| JP | 2021-141467 A | 9/2021 |

OTHER PUBLICATIONS

U.S. Appl. No. 18/669,555, filed May 21, 2024.

* cited by examiner

*Primary Examiner* — Sath V Perungavoor
*Assistant Examiner* — Tyler B Edwards
(74) *Attorney, Agent, or Firm* — XSENSUS LLP

(57) ABSTRACT

A reading device includes a light source to irradiate a subject with visible light and invisible light in a light incident direction, an imager to receive the visible light and the invisible light reflected from the subject and image a visible image and an invisible image, and a background member disposed at an imaging region of the imager to reflect at least the visible light. The background member includes a first white resin layer and a second white resin layer on the first white resin layer, and an invisible light absorption layer on the second white resin layer. The second white resin layer has a visible light resistance higher than the first resin layer. The invisible light absorption layer absorbable the invisible light. The invisible light absorption layer, the second white resin layer, and the first white resin layer are disposed in this order in the light incident direction.

12 Claims, 12 Drawing Sheets

VISIBLE IMAGE

INVISIBLE IMAGE

VISIBLE IMAGE

INVISIBLE IMAGE

EDGE IMAGE

IMAGE BEFORE CORRECTION

IMAGE AFTER CORRECTION OF INCLINATION AND POSITION

IMAGE AFTER TRIMMING

READING DEVICE, IMAGE PROCESSING APPARATUS, AND READING METHOD

CROSS-REFERENCE TO RELATED APPLICATIONS

This patent application is based on and claims priority pursuant to 35 U.S.C. § 119(a) to Japanese Patent Application No. 2023-194217, filed on Nov. 15, 2023, in the Japan Patent Office, the entire disclosure of which is hereby incorporated by reference herein.

BACKGROUND

Technical Field

Embodiments of the present disclosure relate to a reading device, an image processing apparatus, and a reading method.

Related Art

In the related art, in an image reading device that reads a document, an image processing technique is known that corrects the inclination or position of the document, or trims a read document image to match a predetermined size based on an edge between the read document image and the detected background.

For example, there is a technique including the background member to reflect invisible light (e.g., infrared light) with a reflectance lower than the reflectance of the visible light to detect the edge between the document and the background. The background member is coated with an infrared light absorber on the white document pressing face.

For example, it is also conceivable that the background member includes a white resin layer under a transparent invisible light absorption layer, to reflect invisible light with a reflectance lower than the reflectance of visible light. However, there is a problem that the whiteness and luminance in the visible wavelength range cannot be increased because an adverse effect such as the peeling of a coating film of the white resin layer adhered to a metal sheet is caused by increasing the thickness of the coating film.

SUMMARY

According to an embodiment of the present disclosure, a reading device includes a light source to irradiate a subject with visible light and invisible light in a light incident direction, an imager to receive the visible light and the invisible light reflected from the subject and image a visible image and an invisible image, and a background member disposed at an imaging region of the imager to reflect at least the visible light. The background member includes a first white resin layer and a second white resin layer on the first white resin layer, and an invisible light absorption layer on the second white resin layer. The second white resin layer has a visible light resistance higher than the first resin layer. The invisible light absorption layer absorbable the invisible light. The invisible light absorption layer, the second white resin layer, and the first white resin layer are disposed in this order in the light incident direction.

According to an embodiment of the present disclosure, an image processing apparatus includes the image reading device and an image forming unit.

According to an embodiment of the present disclosure, a reading method includes irradiating a subject and a background member with visible light and invisible light from a light source in a light incident direction, imaging a visible image and an invisible image from the visible light and the invisible light reflected by the subject and the background member, and detecting a feature amount of the subject or the background member from at least one of the visible image or the invisible image. The background member includes a first white resin layer, a second white resin layer on the first white resin layer, and an invisible light absorption layer on the second white resin layer. The second white resin layer has a visible light resistance higher than the first white resin layer, and the invisible light absorption layer absorbs the invisible light. The invisible light absorption layer, the second white resin layer, and the first white resin layer are disposed in this order in the light incident direction;

Figure 1:
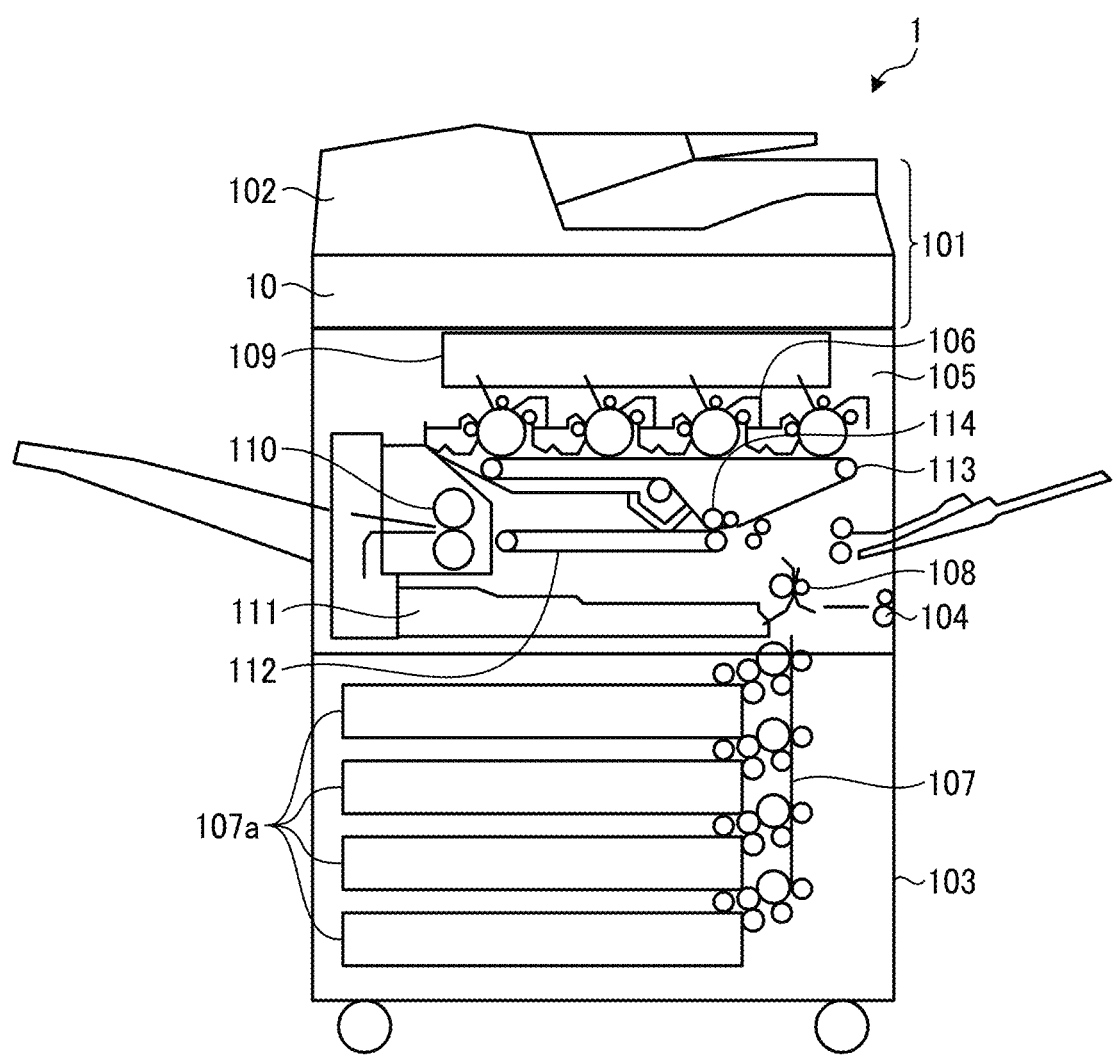
FIG. 1 is a diagram illustrating an example of a configuration of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the present disclosure, the whiteness and luminance of the background member can be increased even if the background member reflects invisible light with a reflectance lower than the reflectance of visible light.

Embodiments of a reading device, an image processing apparatus, and a reading method will be described in detail below with reference to the accompanying drawings.

First Embodiment

FIG. 1 is a diagram illustrating an example of a configuration of an image forming apparatus 1 according to a first embodiment. In FIG. 1, the image forming apparatus 1 that is an image processing apparatus is typically referred to as a multifunction peripheral having at least two functions of a copy function, a printer function, a scanner function, or a facsimile function.

The image forming apparatus 1 includes an image reading device 101 as a reading device, and an image forming unit 103 under the image reading device 101. The image forming unit 103 is illustrated without an outer cover for describing the internal structure of the image forming unit 103.

The image reading device 101 includes a main body 10 and an automatic document feeder (ADF) 102 disposed above the main body 10. The ADF 102 is a document support unit that positions a document from which an image is to be read at a reading position. The ADF 102 automatically conveys the document placed on the table to the reading position. The image reading device 101 reads the document conveyed by the ADF 102 at a predetermined reading position. The image reading device 101 includes a contact glass that is a document support member on which a document is placed, is disposed at the upper face of the image reading device 101, and reads a document on the contact glass that is a reading position. Specifically, the image reading device 101 is a scanner including a light source, an optical system, and a solid-state image sensing device such as a complementary metal-oxide semiconductor (CMOS) image sensor inside the scanner, and reads reflected light from the document illuminated with the light from the light source by the solid-state image sensing device through the optical system.

The image forming unit 103 includes a bypass feeding roller 104 that manually bypass-feeds a recording sheet or a recording sheet feeding unit 107 that feeds a recording sheet. The recording sheet feeding unit 107 includes a unit that brings out a recording sheet from multi-stage recording sheet feeding cassettes 107a. The fed recording sheet is sent to a secondary transfer belt 112 via a registration roller 108.

A toner image on an intermediate transfer belt 113 is transferred to the recording sheet conveyed on the secondary transfer belt 112 in a transfer unit 114.

The image forming unit 103 includes an optical writing unit 109, image forming units (for yellow (Y), magenta (M), cyan (C), and black (K)) 105 of a tandem type, the intermediate transfer belt 113, and the secondary transfer belt 112. The images written by the optical writing unit 109 are formed as a toner image on the intermediate transfer belt 113 in an image forming process by the image forming units 105.

Specifically, the image forming units (for Y, M, C, and K) 105 include four photoconductive drums (for Y, M, C, and K) that are rotatable, and each of the photoconductive drums includes an image forming element 106 including a charging roller, a developing device, a primary transfer roller, a cleaner unit, and a static eliminator. The image forming element 106 functions on each photoconductive drum, and the image on the photoconductive drum is transferred to the intermediate transfer belt 113 by each primary transfer roller.

The intermediate transfer belt 113 is disposed so as to pass through nips between the photoconductive drums and the primary transfer rollers, and to be stretched by a driving roller and driven rollers. The toner image primarily transferred to the intermediate transfer belt 113 is secondarily transferred to a recording sheet on the secondary transfer belt 112 with a secondary transfer device by moving the intermediate transfer belt 113. The recording sheet is conveyed to a fixing device 110 by moving the secondary transfer belt 112, and the toner image is fixed on the recording sheet. The recording sheet is ejected to an ejection tray outside the image forming apparatus 1. In the case of double-sided printing, the recording sheet is reversed by a reversing unit 111, and the reversed recording sheet is sent onto the secondary transfer belt 112.

The image forming unit 103 is not limited to a unit that forms an image by the electrophotographic method as described above, but may form an image by an inkjet method.

The image reading device 101 will be described below.

Figure 2:
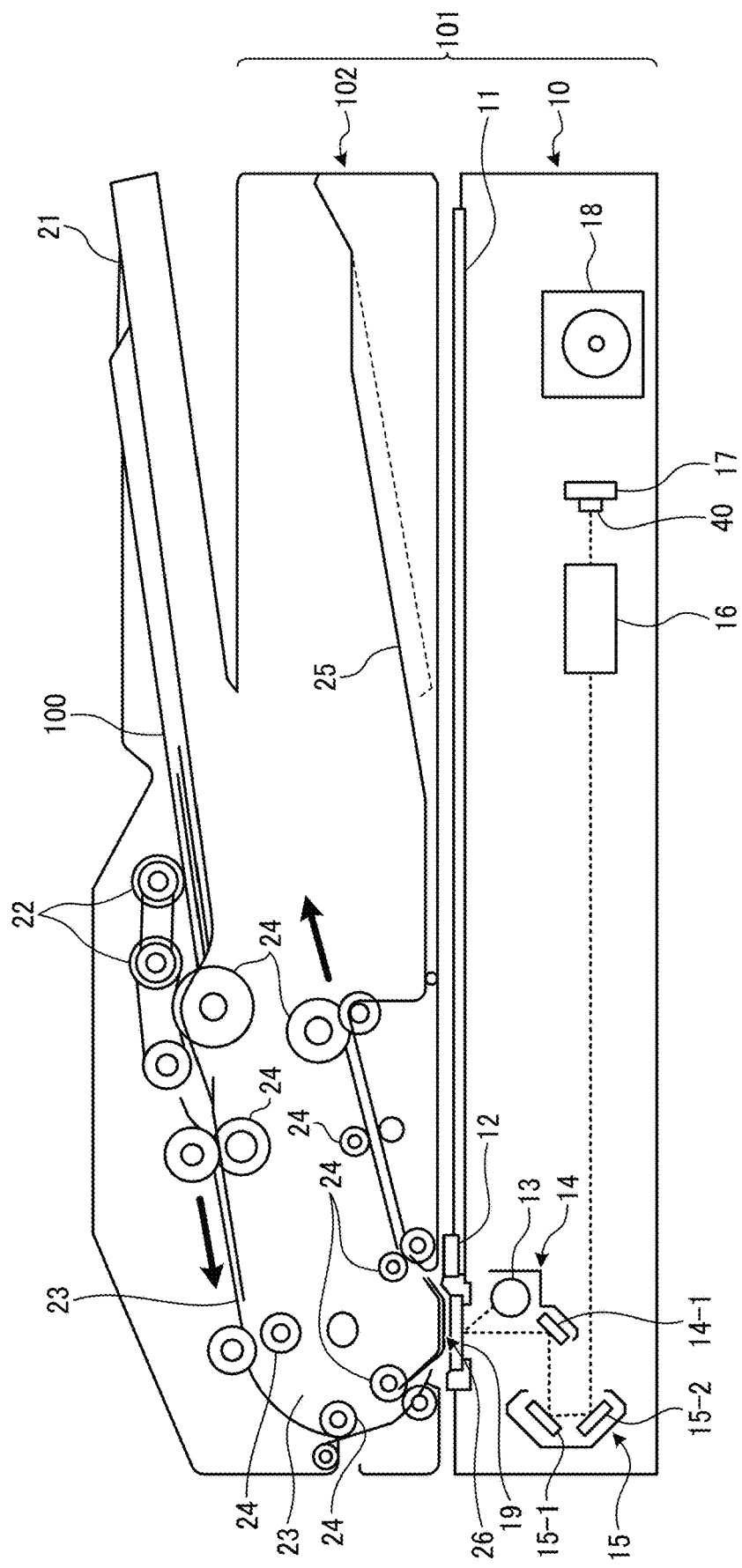
FIG. 2 is a diagram illustrating an example of a configuration of an image reading device.

FIG. 2 is a diagram illustrating an example of a configuration of the image reading device 101. The main body 10 of the image reading device 101 includes a contact glass 11 at the upper face. The image reading device 101 includes a light source 13, a first carriage 14, a second carriage 15, a lens unit 16, and a sensor board 17 inside the main body 10. In FIG. 2, the first carriage 14 includes the light source 13 and a reflection mirror 14-1, and the second carriage 15 includes reflection mirrors 15-1 and 15-2.

The light source 13 emits light. The reading object is irradiated with the light, and reflects the light. The reflected light from the reading object is bent by the reflection mirror 14-1 of the first carriage 14 and the reflection mirrors 15-1 and 15-2 of the second carriage 15, and goes in the lens unit 16. Accordingly, an image of the reading object is imaged on a light receiving surface of the sensor board 17 from the lens unit 16. The sensor board 17 includes an imaging unit 40 that is a line sensor such as a charge coupled device (CCD) or a CMOS sensor, and sequentially converts an image of the reading object imaged on the light receiving surface of the imaging unit 40 into an electric signal. A white reference plate 12 is a white density reference member that is read for correcting variations in the light amount of the light source 13 and variations in the pixels (i.e., pixel circuits) of the imaging unit 40.

The image reading device 101 includes a control board in the main body 10, and the control board controls each part of the main body 10 and the ADF 102 to read the reading object by a predetermined reading method. The reading object is a recording medium on which, for example, characters or a pattern is formed. Such a recording medium is referred to as a document in the following description. The document corresponds to the "subject", and is described as a paper, a sheet, or a transparent sheet (e.g., an overhead projector (OHP) sheet) as an example. However, the document is not limited to the paper, the sheet, or the transparent sheet.

The image reading device 101 reads a document 100 by a sheet-through method using the ADF 102. The ADF 102 is an example of a "conveying unit". In the configuration illustrated in FIG. 2, the image reading device 101 separates the document 100 sheet by sheet from the document bundle on a tray 21 of the ADF 102 by pickup rollers 22, conveys the document 100 to a conveying path 23, reads a reading surface of the document 100 at the reading position of the reading unit, and ejects the document 100 to an ejection tray 25. The document 100 is conveyed by the rotation of various conveying rollers 24.

The image reading device 101 passes the document 100 between a reading window 19 and a background member 26 of the reading unit in a state where, for example, the first carriage 14 and the second carriage 15 are moved to and fixed at predetermined home positions. The reading window 19 is a reading window having a slit shape disposed in a portion of the contact glass 11. The background member 26 is a member disposed at a position opposed to the reading window 19. The reading unit irradiates the first surface (front surface or back surface) of the document 100 facing the reading window 19 with the light from the light source 13 while the document 100 passes through the reading window 19, and receives the reflected light by the imaging unit 40 on the sensor board 17 to read an image. The background member 26 may be, for example, a metal plate or a roller as long as the background member 26 has a size included in the imaging range of the imaging unit 40.

The light source 13, the background member 26, the optical system (including the reflection mirror 14-1, the reflection mirrors 15-1 and 15-2, and the lens unit 16) that guides the reflected light from the document 100 to the imaging unit 40 on the sensor board 17, and the imaging unit 40 are described as a reading unit (i.e., first reading unit). The configuration of the reading unit will be described again with reference to FIG. 5.

When the reading unit reads both sides of the document 100, for example, a reversing unit for reversing the front and back sides is included. Since the image reading device 101 includes the reversing unit to reverse the document 100, the document 100 is reversed, and the second surface of the document 100 is read at a reading position (i.e., reading window 19) of the reading unit. As another configuration, the image reading device 101 may include, for example, the second reading unit to read the second surface instead of the reversing unit. For example, after the document 100 passes through the reading window 19, the second surface of the document 100 is read by the reading unit (i.e., second reading unit) including a reading sensor disposed to face the back side of the document 100. In this case, a member corresponding to the background member 26 (see FIG. 3) is disposed at a position opposed to the reading sensor.

The image reading device 101 according to the present embodiment can read the document 100 by a flatbed method. Specifically, the ADF 102 is lifted to expose the contact glass 11, and the document 100 is directly placed on the contact glass 11. The ADF 102 is lowered to its original position, and the back surface of the document 100 is pressed by a lower portion of the ADF 102. In the flatbed method, since the document 100 is fixed, the carriages including the first carriage 14 and the second carriage 15 are moved to scan the document 100. The first carriage 14 and the second carriage 15 are driven by a scanner motor 18, and scan the document 100 in the sub-scanning direction. For example, the first carriage 14 moves at a speed V, and at the same time, the second carriage 15 moves at a speed ½ V, which is a half-speed of the first carriage 14, in conjunction with the movement of the first carriage 14, and the first surface of the document 100 on the contact glass 11 is read. In this case, the lower portion of the ADF 102, which is a member that presses the document 100 from the back surface, corresponds to the background member 26 (see FIG. 3).

In this example, the first carriage 14, the second carriage 15, the lens unit 16, and the sensor board 17 are illustrated separately, but these may be disposed individually or as an integrated sensor module as one body.

Figure 3:
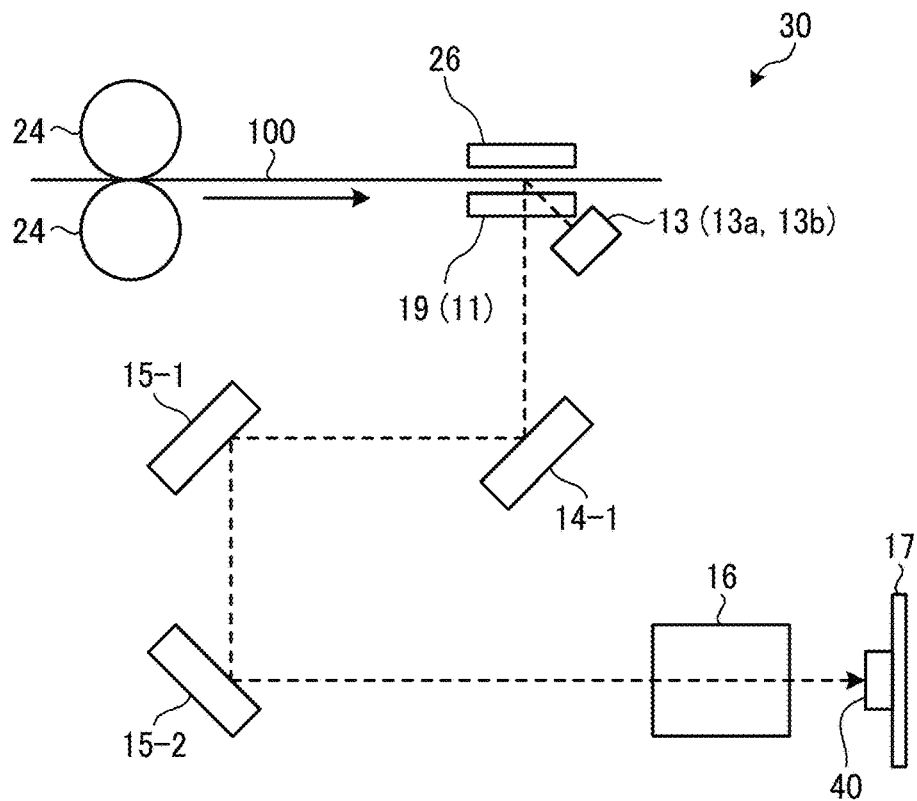
FIG. 3 is a diagram illustrating an example of a configuration of a reading unit.

FIG. 3 is a diagram illustrating an example of a configuration of a reading unit 30. As an example, the configuration of the reading unit 30 (i.e., first reading unit) that reads the first surface of the document 100 and the conveying unit are illustrated. As illustrated in FIG. 3, the document 100 is sent by various conveying rollers 24 and passes between the reading position (i.e., reading window 19) of the contact glass 11 and the background member 26.

The reading unit 30 includes the background member 26 as a set. In the reading unit 30, the light source 13 emits light to the first surface of the document 100 passing through the reading window 19. The first surface faces the reading window 19. The light incident on the first surface is reflected by the first surface as reflected light. The reflected light reaches the imaging unit 40 on the sensor board 17 along the dashed line illustrated in FIG. 3. In other words, the imaging unit 40 receives the reflected light to read the image. In such a way, the reading unit 30 reads the image.

The configuration of the reading unit is not limited to the configuration of the first reading unit. The configuration of the reading unit may be modified as appropriate according to a method by which the image is read with a contact type image sensor as in the case of the second reading unit, or according to the configuration of the image reading device.

As illustrated in FIG. 3, the light source 13 according to the present embodiment is an illumination unit that includes a visible light source 13a and an invisible light source 13b, and irradiates the subject with visible light and invisible light. The visible light source 13a irradiates the subject or the background member 26 with visible light. The invisible light source 13b irradiates the subject or the background member 26 with the invisible light. It is effective to use infrared light as the invisible light source 13b. Typically, the wavelength range of the visible light is 380 to 750 nanometers (nm), and the wavelength range over 750 nm is the infrared wavelength range, which is the wavelength range of invisible light.

In the present embodiment, the invisible light source 13b emits invisible light in the infrared wavelength range of 750 nm or more, but the invisible light of the invisible light source is not limited to this rage, and the invisible light source may emit invisible light in the ultraviolet wavelength range of 380 nm or less.

The configuration of the background member 26 will be described below.

In the related art, in the image reading device, a white resin layer is disposed under a transparent invisible light absorption layer for detecting an edge between a document and a background as described later. Accordingly, the invisible light is reflected with a reflectance lower than the reflectance of the visible light. However, the background member in the related art has a problem that whiteness and luminance are not sufficient as compared with the white resin layer alone because the visible light component is also absorbed to a considerable extent by the transparent invisible light absorption layer.

Figure 4:
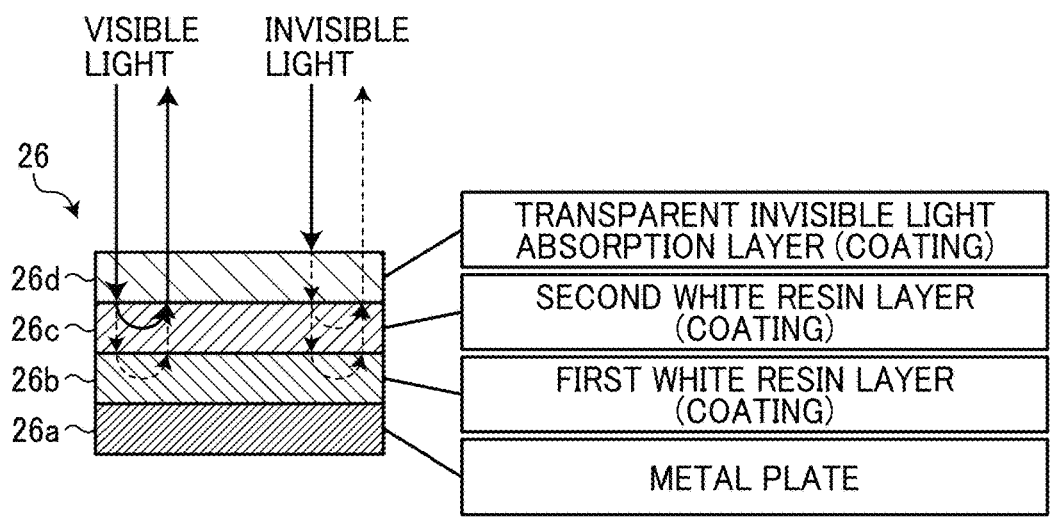
FIG. 4 is a diagram illustrating an example of a configuration of a background member.

FIG. 4 is a diagram illustrating an example of a configuration of the background member 26. As illustrated in FIG. 4, the background member 26 according to the present embodiment includes a metal plate 26a as a base member, a first white resin layer 26b disposed on the metal plate 26a, a second white resin layer 26c disposed on the first white resin layer 26b, and a transparent invisible light absorption layer 26d disposed on the second white resin layer 26c. Thus, the background member 26 according to the present embodiment includes two white resin layers (i.e., the first white resin layer 26b and the second white resin layer 26c) and the transparent invisible light absorption layer 26d on the metal plate 26a. In other words, the two white resin layers (i.e., the first white resin layer 26b and the second white resin layer 26c) are disposed downstream from the transparent invisible light absorption layer 26d in a direction in which the light from the light source 13, which is an illumination unit, is incident on the transparent invisible light absorption layer 26d.

The first white resin layer 26b is a coating film that coats the metal plate 26a with a first white coating material. The first white resin layer 26b has a thickness of, for example, 15 to 20 micrometers (m). The first white resin layer 26b uses a white coating material having high adhesion to the metal plate 26a.

However, when the thickness of the coating film of the first white resin layer 26b that is the lowermost layer to be adhered to the metal plate 26a is increased, an adverse effect such as peeling occurs. In the present embodiment, thus, the second white resin layer 26c is disposed on the first white resin layer 26b. Accordingly, the whiteness and luminance of the visible wavelength range can be adjusted.

The second white resin layer 26c is a coating film that coats the first white resin layer 26b with a second white coating material. The second white resin layer 26c has a thickness of, for example, 15 to 20 μm. The second white resin layer 26c has reflection characteristics of the visible light higher than the reflection characteristics of the first white resin layer 26b.

As described above, a white coating material having high adhesion to the metal plate 26a is used for the first white resin layer 26b. Thus, it is difficult for the first white resin layer 26b to satisfy both the light resistance to visible light and the adhesive property.

In the present embodiment, thus, the second white resin layer 26c having a light resistance to visible light higher than the light resistance to visible light of the first white resin layer 26b is disposed upstream from the first white resin layer 26b in a direction in which the light from the light source 13 is incident on the first white resin layer 26b. Accordingly, even if the first white resin layer 26b has low light resistance to visible light, the background member 26 can be prevented from being aged by visible light.

In other words, the second white resin layer 26c can have whiteness and luminance higher than the whiteness and luminance of the first white resin layer 26b because only the light resistance to visible light needs to be considered without considering the adhesion to the metal plate 26a.

The transparent invisible light absorption layer 26d is a coating film that coats the second white resin layer 26c with a transparent invisible light absorption coating material. The transparent invisible light absorption layer 26d has a thickness, for example, 15 to 20 μm. The transparent invisible light absorption layer 26d absorbs the invisible light with which the invisible light source 13b irradiates the transparent invisible light absorption layer 26d. For example, the invisible light absorption coating material that forms the transparent invisible light absorption layer 26d contains an infrared light absorption component as an absorbing invisible light component.

In the background member 26 according to the present embodiment, since the transparent invisible light absorption layer 26d has high transparency of visible light, a large amount of visible light is incident on the second white resin layer 26c. However, the visible light hardly reaches the first white resin layer 26b of the lowermost layer. For this reason, in the case where the first white resin layer 26b has low light resistance to visible light, the second white resin layer 26c having high light resistance is disposed. Thus, the first white resin layer 26b can be prevented from being aged by visible light.

In the present embodiment, since two white resin layers are used in the background member 26, the second white resin layer 26c can also protect the first white resin layer 26b.

In the background member 26 according to the present embodiment, two white resin layers are used. However, the number of white resin layers is not limited to two, and three or more white resin layers may be used.

Further, each of the first white resin layer 26b, the second white resin layer 26c, and the transparent invisible light absorption layer 26d may contain an anti-yellowing agent. As a result, the first white resin layer 26b and the second white resin layer 26c can maintain whiteness and luminance in the visible wavelength range. The transparent invisible light absorption layer 26d is disposed at the uppermost layer to absorb invisible light and transmit visible light, and can prevent yellowing due to aging deterioration and maintain whiteness and luminance in the visible wavelength range.

Figure 5:
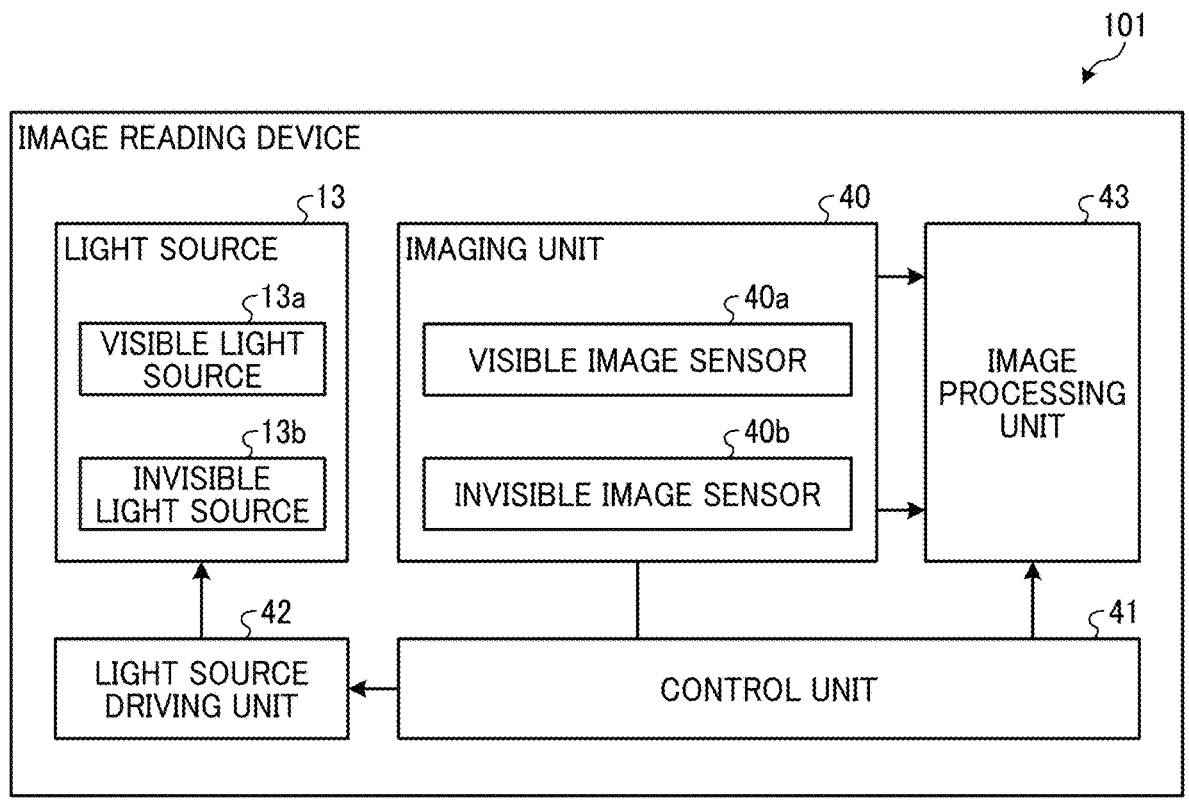
FIG. 5 is a block diagram of electric connections between components included in an image reading device.

FIG. 5 is a block diagram of electric connections between components included in an image reading device 101. As illustrated in FIG. 5, the image reading device 101 includes a control unit 41, a light source driving unit 42, and an image processing unit 43 in addition to the imaging unit 40 and the light source 13. The control unit 41 controls the imaging unit 40, the light source driving unit 42, and the image processing unit 43. The light source driving unit 42 drives the light source 13 under the control of the control unit 41. The imaging unit 40 sends a signal to the image processing unit 43 disposed in the following stage.

The imaging unit 40 includes an invisible light image sensor 40b functioning as an invisible image reading unit and a visible light image sensor 40a functioning as a visible image reading unit. The imaging unit 40 receives the visible light and the invisible light reflected by the subject and images the visible image and the invisible image. More specifically, the invisible light image sensor 40b acquires an invisible image (i.e., image in the invisible light wavelength range) by reading the invisible reflected light from the subject, which is a portion of the invisible light. The visible light image sensor 40a acquires a visible image (i.e., image in a visible light wavelength range) by reading the visible reflected light from the subject, which is a portion of the visible light. The invisible light image sensor 40b and the visible light image sensor 40a are sensors for a reduction optical system, and are, for example, CMOS image sensors.

The visible light image sensor 40a and the invisible light image sensor 40b may be integrated as one body. Accordingly, since the visible light and the infrared light are read closer to each other with a smaller structure, the lost information can be extracted and recovered with high accuracy. In other words, there is no displacement of the image due to the multiple image readings, and the correction can be performed with high positional accuracy.

The image processing unit 43 executes various types of image processing in accordance with the purpose of use of the image data. The image processing unit 43 may be implemented by hardware or software.

Figure 6:
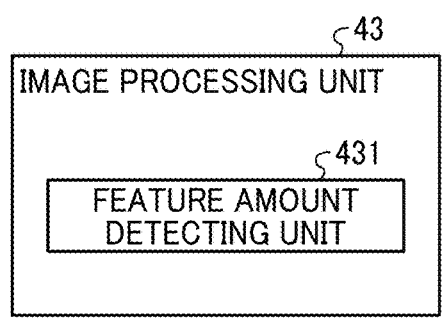
FIG. 6 is a block diagram of a functional configuration of an image processing unit.

FIG. 6 is a block diagram of a functional configuration of the image processing unit 43. As illustrated in FIG. 6, the image processing unit 43 includes a feature amount detecting unit 431. The image processing unit 43 detects the feature amount of the subject or the background member 26 from at least one of the visible image or the invisible image obtained by the image reading apparatus 101 in the feature amount detecting unit 431. The feature amount may be, for example, an edge between the background member 26 and the document 100. The image processing unit 43 uses the detected feature amount for the correction process of the image itself as be described in detail later.

The difference in the spectral reflectance characteristics of the imaging unit 40 depending on the medium will be described.

Figure 7:
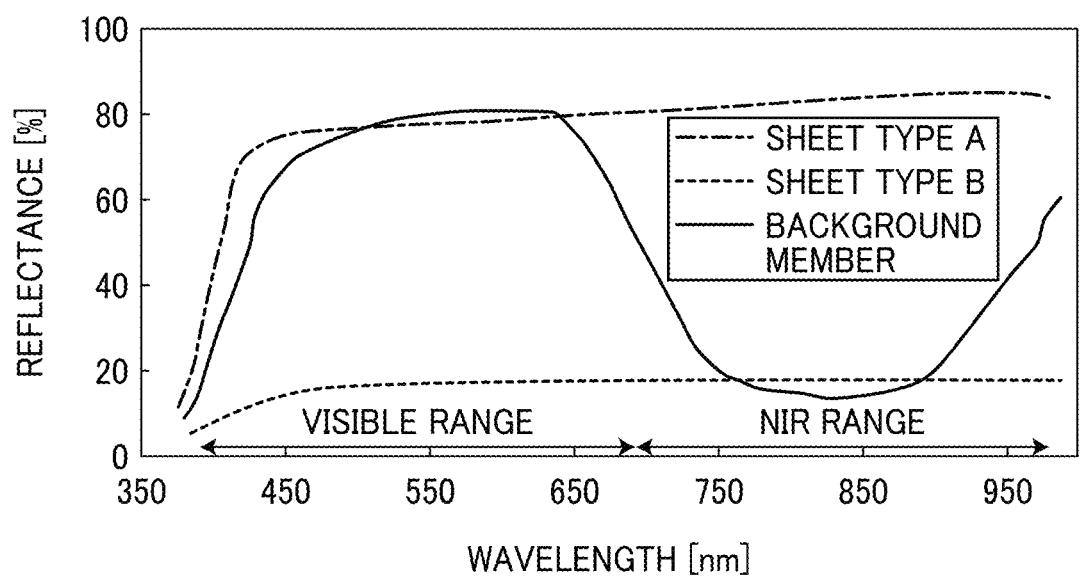
FIG. 7 is a graph of spectral reflectance characteristics for each medium.
Figure 8A:
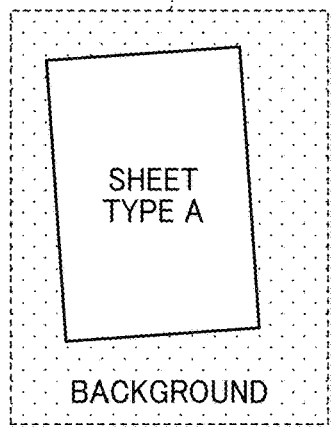
FIG. 8A is a diagram illustrating an example of a visible image of a type of sheet and a background.
Figure 8B:
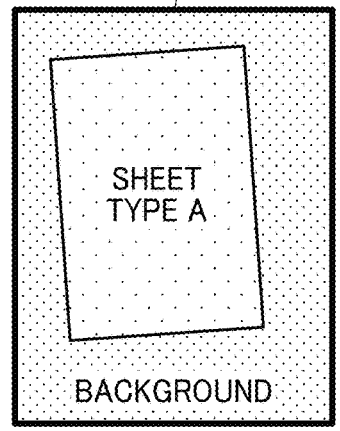
FIG. 8B is a diagram illustrating an example of an invisible image of a type of sheet and a background.
Figure 8C:
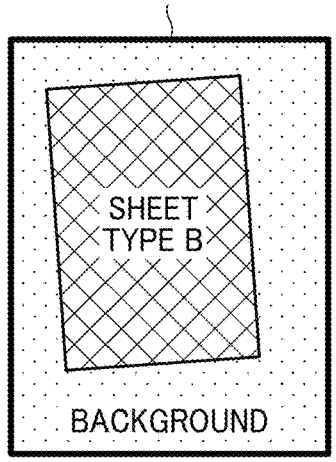
FIG. 8C is a diagram illustrating an example of a visible image of another type of sheet and a background.
Figure 8D:
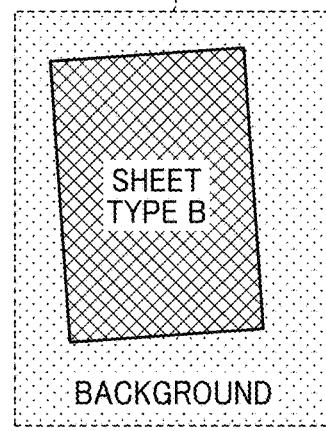
FIG. 8D is a diagram illustrating an example of an invisible image of another type of sheet and a background.

FIG. 7 is a graph of spectral reflectance characteristics depending on mediums. FIG. 7 is a diagram illustrating the spectral reflectance characteristics of two types of plain sheet (i.e., plain paper) typically used as documents, which referred to as a sheet type A and a sheet type B, which are the reading objects by the image reading device 101, and the background member 26. In FIG. 7, a graph of a dash-dotted line is a graph of the spectral reflection characteristics of one plain sheet (i.e., sheet type A), a graph of a dashed line is a graph of the spectral reflectance characteristics of the other plain sheet (i.e., sheet type B), and a graph of a solid line is a graph of the spectral reflectance characteristics of the background member 26.

As can be understood from FIG. 7, the reflectance of the background member 26 that is a white background is higher than the reflectance of each of the plain sheets in the visible wavelength range, but the reflectance of the background member 26 is lower than the reflectance of each of the plain sheets (i.e., sheet type A and sheet type B) in the near infrared (NIR) wavelength range.

FIGS. 8A to 8D are diagrams illustrating differences between a visible image and an invisible image. As illustrated in FIGS. 8A to 8D, in the case where the imaging unit 40 reads the reflected light, the spectral reflectance characteristics of the background member 26 and the document are different from each other, and images having different feature amounts are obtained for visible light and invisible light. Accordingly, it is easy to obtain a target feature amount by previously setting an image as a detection target to either a visible image or an invisible image in accordance with the type of the subject or the type of the background member 26.

For example, in the case of the example illustrated in FIGS. 8A to 8D, since the difference in spectral reflectance characteristics between the sheet type A and the background member 26 is larger in the invisible image than in the visible image. Accordingly, in the case of the sheet type A, the detection target of the feature amount can be set to the invisible image. In the case of the sheet type B, conversely, the detection target of the feature amount can be set to the visible image.

The feature amounts may be extracted from both the visible image and the invisible image, and may be selected or unified from the results of the extraction.

An example of edge detection of the document 100 as the subject and an example of correction of the inclination and position of the document by the feature amount detecting unit 431 will be described below.

Figure 9A:
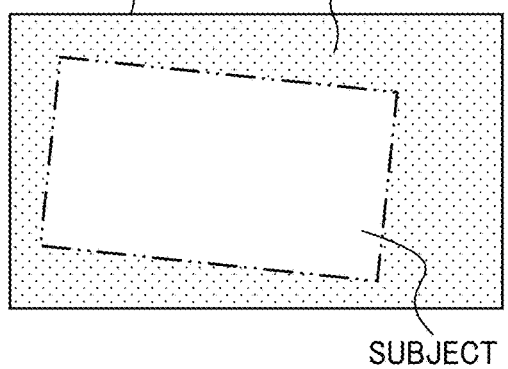
FIG. 9A is a diagram illustrating an example of an invisible image of a subject and a background.
Figure 9B:
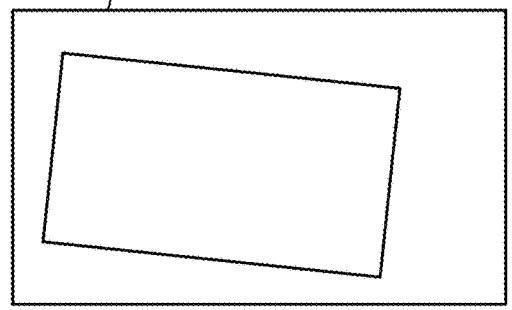
FIG. 9B is a diagram illustrating an example of an edge image detected from the invisible image in FIG. 9A.
Figure 10A:
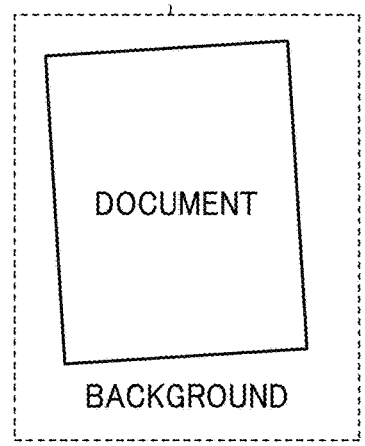
FIG. 10A is a diagram illustrating an example of a document image before correction.
Figure 10B:
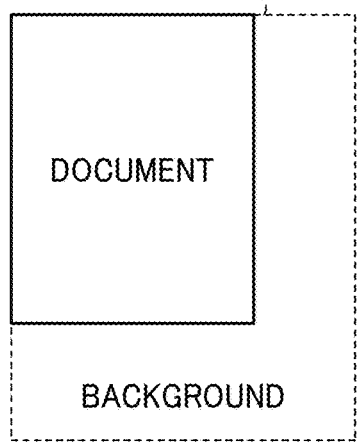
FIG. 10B is a diagram illustrating an example of a corrected document image after correction of the inclination and position of the document image in FIG. 10A.
Figure 10C:
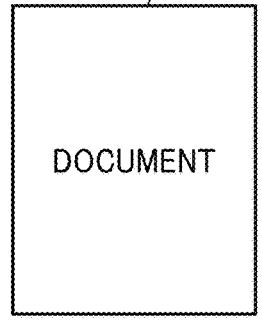
FIG. 10C is a diagram illustrating an example of a trimmed document image after trimming of the corrected document image in FIG. 10B.
Figure 11:
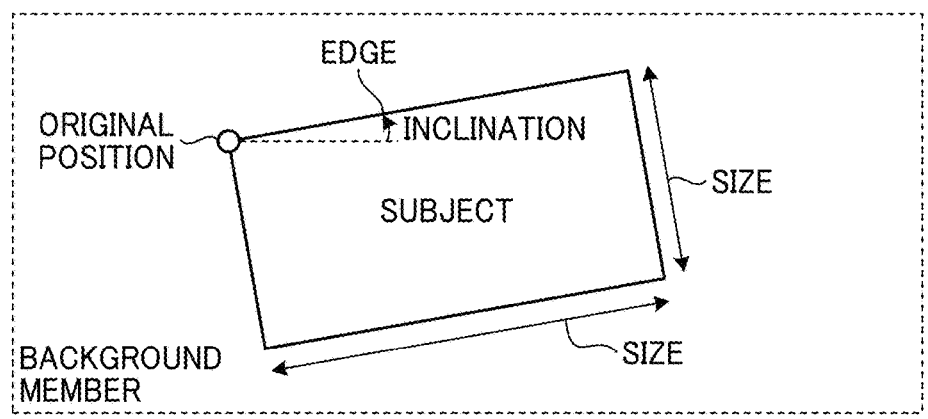
FIG. 11 is a diagram illustrating information obtained from the edge of an edge image of a subject.

FIGS. 9A and 9B are diagrams illustrating an example of edge detection of a subject. FIGS. 10A to 10C are diagrams illustrating an example of correction of the inclination and position of a document. FIG. 11 is a diagram illustrating information obtained from the edge of the subject. For example, as illustrating in FIGS. 9A and 9B, when the edge between the background member 26 and the document 100 is extracted from an image, it is preferable to reduce the reflectance of the background member 26 and use an invisible image. Further, as illustrating in FIGS. 10A to 10C, when the inclination and position of the document are corrected and the document image is trimmed, it is preferable to reduce the reflectance of the background member 26 and use an invisible image.

As illustrated in FIG. 11, the edge indicates a boundary between the document 100 of the subject and the background member 26. Since such an edge is detected, as illustrated in FIG. 11, the position, inclination, and size of the document 100 of the subject can be recognized. From the position, inclination, and size of the document 100 of the subject, the image correction corresponding to the position, inclination, and size of the document 100 of the subject can be performed in the following process.

Figures 12A, 12B:
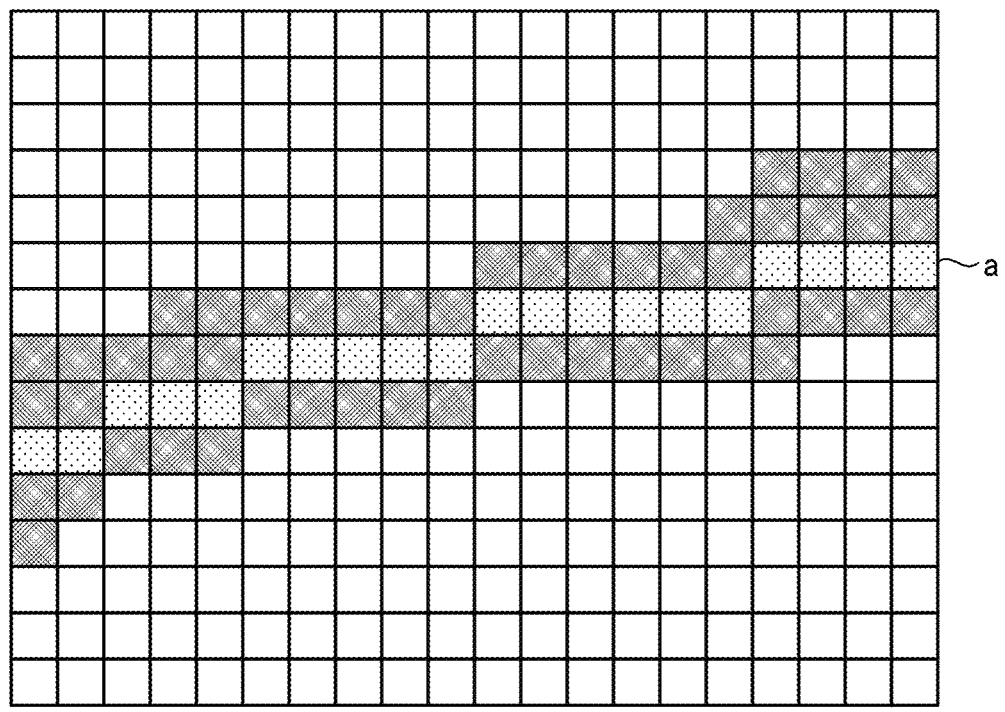
FIG. 12A is a diagram illustrating an example of a first derivation filter used in an edge detection method.
FIG. 12B is a diagram illustrating an example of a result of edge detection.

FIGS. 12A and 12B are diagrams of examples of an edge detection method. As an edge detection method, for example, as illustrated in FIG. 12A, there is a method that applies a first derivative filter to the entire image and binarizing each pixel of the image depending on whether a predetermined threshold value is exceeded. At this time, the edge in the lateral direction appears in the longitudinal direction in series of several pixels depending on the threshold value. Conversely, the edge in the longitudinal direction appears in the lateral direction in series of several pixels depending on the threshold value. This is because the edge is blurred mainly due to the modulation transfer function (MTF) characteristics of the optical system. As illustrated in FIG. 12B, there is a method for selecting, for example, the center of consecutive pixels (portions "a" illustrated in FIG. 12B) in order to obtain representative edge pixels for calculation of a regression linear equation or size detection as described below.

Figure 13A:
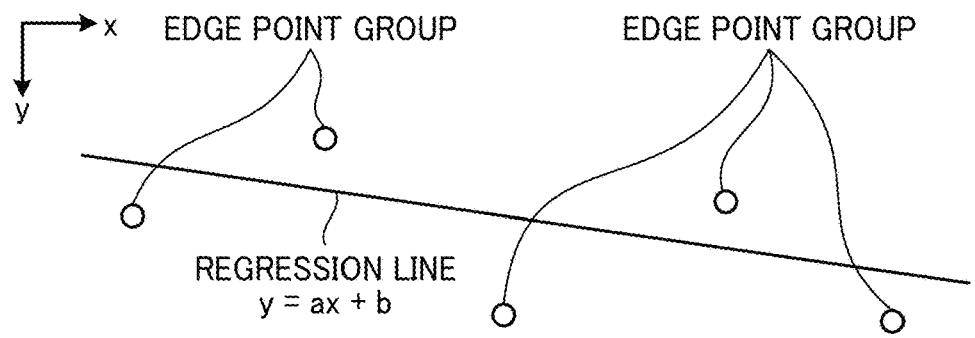
FIG. 13A is a diagram illustrating an example of a feature amount using an edge.
Figure 13B:
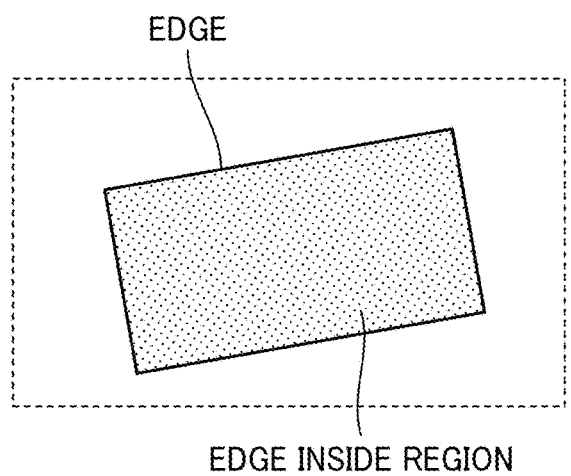
FIG. 13B is a diagram illustrating an example of another feature amount using an edge.

FIGS. 13A and 13B are diagrams illustrating examples of feature amount using the edge. The feature amount may not be the edge itself extracted from the image but may be a feature amount using the edge. For example, a regression linear equation calculated from the extracted edge point group using the least square method as illustrated in FIG. 13A, or an area enclosed by the edge (i.e., a group of positions) as illustrated in FIG. 13B can be used. In terms of the regression linear equation, there is a method of calculating one linear equation from all edge information for each side, or there is also a method of calculating linear equations in multiple divided regions and selecting a representative linear equation or unifying the calculated linear equations. In such a case, as a method of deriving the final linear equation, there is a method that applies a straight line having a median slope or an average value of the linear equations.

Figure 14:
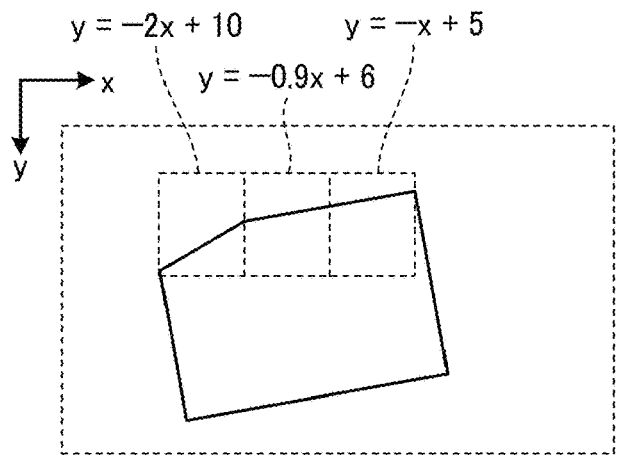
FIG. 14 is a diagram illustrating a selection of a linear equation in a regression linear equation.

FIG. 14 is a diagram illustrating a selection of a linear equation in the regression linear equation. In FIG. 14, the divided multiple regions are used to calculate linear equations. In a process that selects a representative linear equation from the calculated linear equations or unifies the calculated linear equations, even when there is a damage such as a deficit edge of the document 100 of the subject, as illustrated in FIG. 14, the inclination of the document 100 of the subject can be correctly recognized.

In the process described above, since the feature amount detecting unit 431 extracts the edge of the document 100 of the subject as the feature amount, the region of the document 100 of the subject can be detected.

According to the present embodiment, since multiple (e.g., two) white resin layers are disposed under the transparent invisible light absorption layer, whiteness and luminance can be increased even though the background member reflects the invisible light with a reflectance lower than the reflectance of the visible light.

For example, when an adverse effect such as peeling is caused by increasing the thickness of the coating film of the lowermost white resin layer, the whiteness and luminance of the visible wavelength range can be adjusted by further adding a white resin layer to the lowermost white resin layer.

In addition, when the light resistance of the lowermost white resin layer is low, the lowermost white resin layer can be protected by disposing a white resin layer having high light resistance on the lowermost white resin layer.

Second Embodiment

A second embodiment will be described below.

The second embodiment is different from the first embodiment in the configuration of the background member 26. In the following description of the configuration of the second embodiment, the description of the same configurations as in the first embodiment will be omitted, and those different from the first embodiment will be described.

Figure 15:
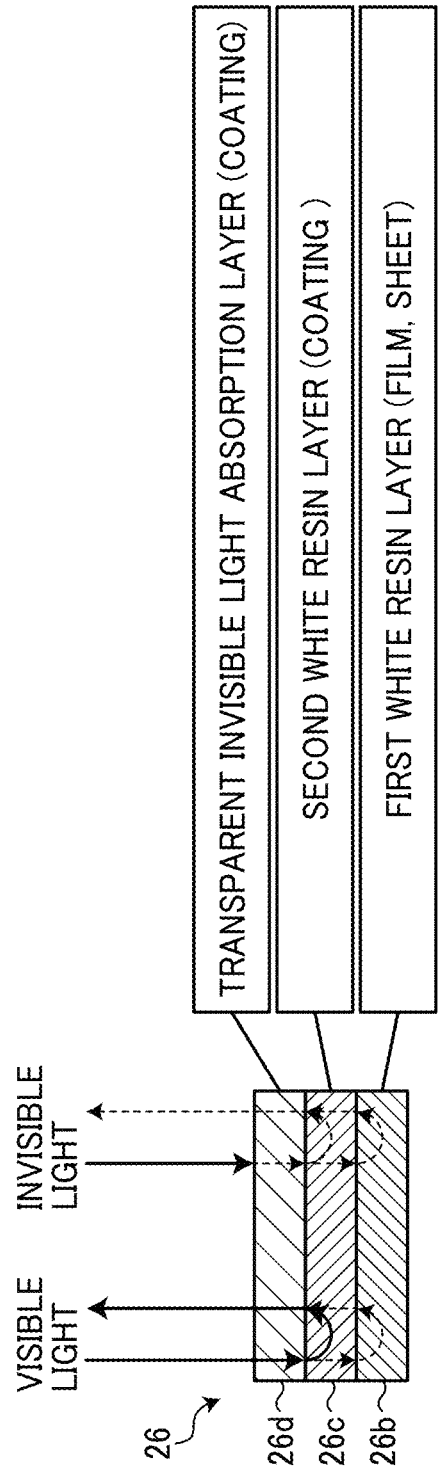
FIG. 15 is a diagram illustrating an example of a configuration of a background member according to a second embodiment.

FIG. 15 is a diagram illustrating an example of a configuration of a background member 26 according to the second embodiment. As illustrated in FIG. 15, the background member 26 according to the present embodiment includes a first white resin layer 26b, a second white resin layer 26c disposed on the first white resin layer 26b, and a transparent invisible light absorption layer 26d disposed on the second white resin layer 26c. In other words, the background member 26 of the present embodiment includes two white resin layers 26b and 26c and a transparent invisible light absorption layer 26d without using the metal plate 26a.

The first white resin layer 26b is a film or a sheet that also serves as a base member in place of the metal plate 26a described in the first embodiment. The first white resin layer 26b has a thickness of, for example, 15 to 20 μm.

The second white resin layer 26c is a coating film that coats the first white resin layer 26b with a second white coating material. The second white resin layer 26c has a thickness of, for example, 15 to 20 μm. As described above, since the first white resin layer 26b serving also as the base member is formed of a film or a sheet, the first white resin layer 26b has poor light resistance to visible light.

In the present embodiment, thus, the second white resin layer 26c having a light resistance to visible light higher than the light resistance of the first white resin layer 26b is disposed upstream from the first white resin layer 26b in a direction in which the light from the light source 13 is incident on the first white resin layer 26b. Accordingly, even if the first white resin layer 26b has low light resistance to visible light, the background member 26 can be prevented from being aged by visible light.

In other words, the second white resin layer 26c can have whiteness and luminance higher than the whiteness and luminance of the first white resin layer 26b because only the light resistance to visible light needs to be considered without considering the adhesion to the metal plate 26a.

The transparent invisible light absorption layer 26d is a coating film that coats the second white resin layer 26c with a transparent invisible light absorption coating material. The transparent invisible light absorption layer 26d has a thickness, for example, 15 to 20 μm. The transparent invisible light absorption layer 26d absorbs the invisible light with which the invisible light source 13b irradiates the transparent invisible light absorption layer 26d.

In the background member 26 according to the present embodiment, since the transparent invisible light absorption layer 26d has high transparency of visible light, a large amount of visible light is incident on the second white resin layer 26c. However, the visible light hardly reaches the first white resin layer 26b of the lowermost layer. Thus, in the case where the first white resin layer 26b has low light resistance to visible light, since the second white resin layer 26c having high light resistance is disposed, the first white resin layer 26b can be prevented from being aged by visible light.

In the present embodiment, the second white resin layer 26c is formed as a coating film that coats the first white resin layer 26b with the second white coating material. However, the second white resin layer 26c is not limited to this coating film, and the second white resin layer 26c may be formed of a film or a sheet. In this case, the film or sheet forming the second white resin layer 26c has a light resistance to visible light higher than the resistance to visible light of the first white resin layer 26b. Accordingly, even if the first white resin layer 26b has low light resistance to visible light, the background member 26 can be prevented from being aged by visible light.

In each of the embodiments described above, the image processing apparatus is described as an example of a multifunction peripheral having at least two of a copy function, a printer function, a scanner function, or a facsimile function. However, the image processing apparatus can be applied to any type of image forming apparatus such as a copying machine, a printer, a scanner, and a facsimile.

Figure 16A:
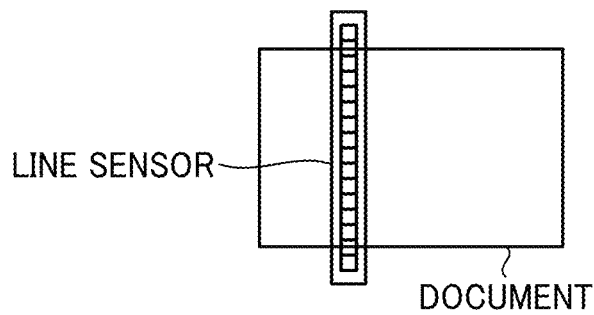
FIG. 16A is a diagram illustrating an image reading device according to a modification.

In each of the embodiments described above, the image reading device 101 of the image forming apparatus 1 is applied as the image processing apparatus, but the image processing apparatus is not limited to the image reading device 101. The image processing apparatus may be an apparatus that includes a same-magnification optical system using a line sensor (e.g., contact optical system (CIS) type) as illustrated in FIG. 16A and can read a document without reading the image of the document. Specifically, the apparatus illustrated in FIG. 16A reads information of multiple lines by moving a line sensor or a document.

Figure 16B:
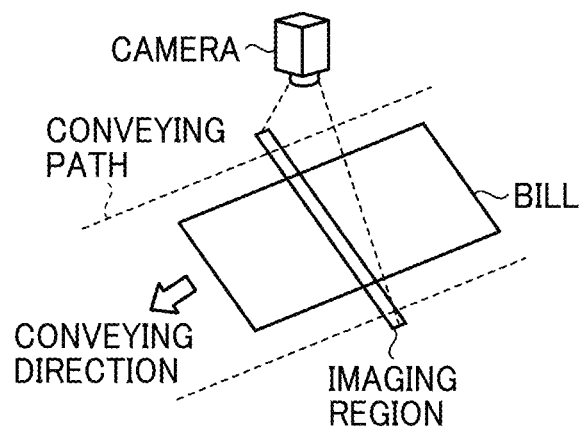
FIG. 16B is a diagram illustrating an image reading device according to another modification.
Figure 16C:
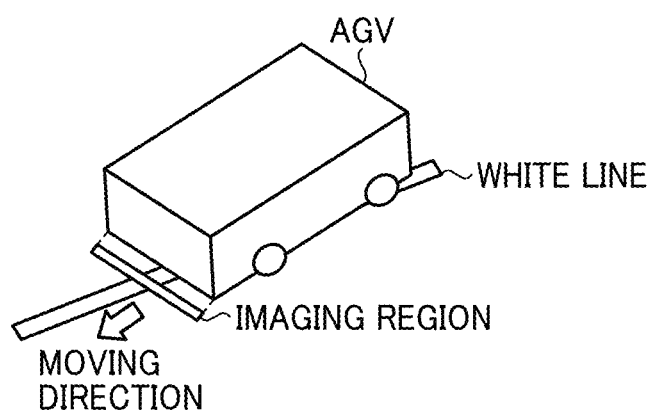
FIG. 16C is a diagram illustrating an image reading device according to still another modification.

The image processing apparatus may also be applied to a bill conveying apparatus illustrated in FIG. 16B or a white line detection apparatus of an automated guided vehicle (AGV) illustrated in FIG. 16C.

The subject of the bill conveying apparatus illustrated in FIG. 16B is a bill. The feature amount detected by the bill conveying apparatus is used for the process of correcting the image itself. In other words, the bill conveying apparatus illustrated in FIG. 16B recognizes the inclination of the bill by edge detection, and performs skew correction using the recognized inclination.

The subject of the white line detection apparatus of the AGV illustrated in FIG. 16C is a white line. The feature amount obtained by the white line detection apparatus of the AGV can be used for determining the moving direction of the AGV. In other words, the white line detection apparatus of the AGV recognizes the inclination of the white line by the edge detection, and determines the moving direction of the AGV using the recognized inclination. In addition, in the white line detection apparatus of the AGV, the moving direction correction based on the position and direction of the AGV can be performed in the following processing. For example, in the case of the AGV, a process that stops driving can be executed when a white line having a thickness different from the known thickness is detected.

Figure 17:
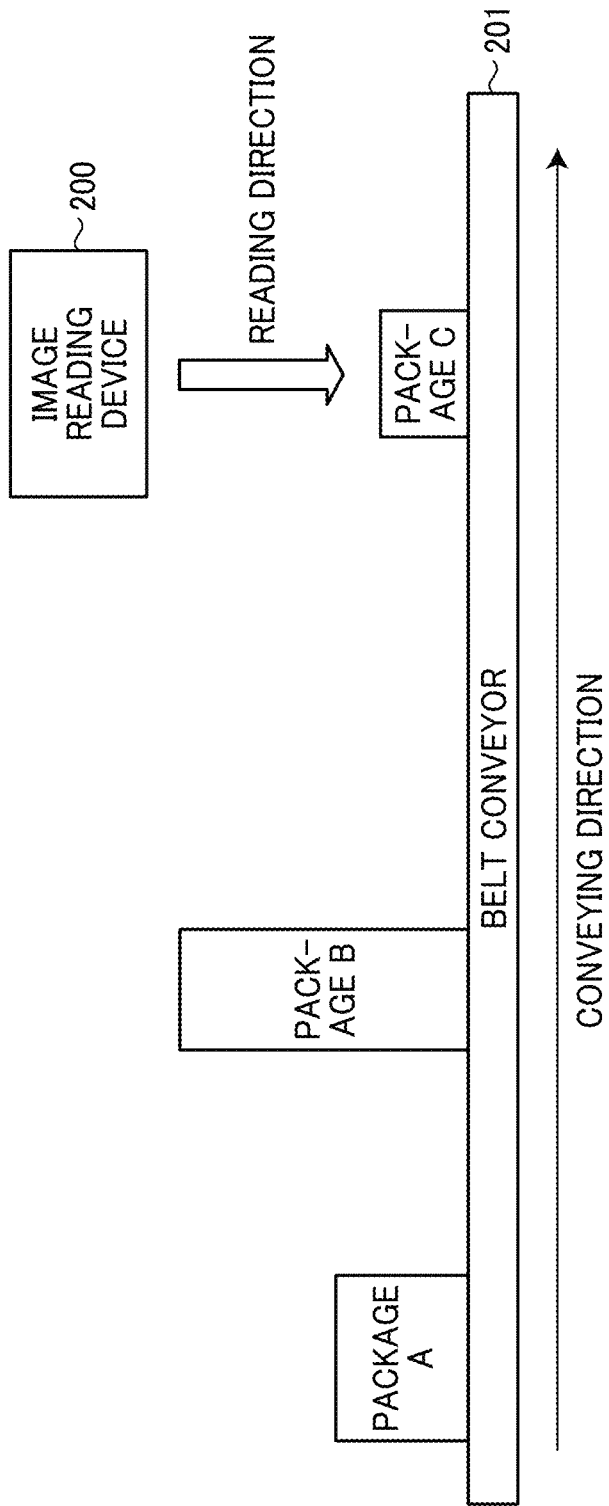
FIG. 17 is a diagram illustrating an image reading device according to still yet another modification.

FIG. 17 is a diagram illustrating an image reading device according to another modification. The example illustrated in FIG. 17 is an application example in which an image processing apparatus is applied to an image reading device 200 used to pack packages in, for example, a production site.

The subjects of the image reading device 200 illustrated in FIG. 17 are packages A, B, and C having different sizes, which are objects to be transported. As illustrated in FIG. 17, when the packages A, B, and C having different sizes are conveyed by a belt conveyor 201, the feature amounts (i.e., edges) of the packages A, B, and C are detected by the image reading device 200 according to the present modification. In detecting the feature amounts of the packages A, B, and C, visible light is effective in the case of a black package, and invisible light is effective in the case of a white package.

In this case, the background member 26 may be a surface of the belt conveyor 201, or the background member 26 may be disposed as a dedicated background member by setting the reading position of the image reading device 200 in a gap between the belt conveyor 201 and the image reading device 200.

The image reading device 200 detects the feature amount (i.e., edge) of the conveyed packages A, B, and C, and selects the size of a container to be used for packing the conveyed packages A, B, and C based on the detection result of the feature amount of the packages A, B, and C. Thus, waste such as the use of an excessively large container can be reduced.

Aspects of the present disclosure are as follows, for example.

First Aspect

A reading device includes an illumination unit to irradiate a subject with visible light and invisible light in a light incident direction, an imaging unit to receive the visible light and the invisible light reflected from the subject and to take a visible image and an invisible image, and a background member that is disposed at an imaging region of the imaging unit and reflects at least the visible light. The background member includes an invisible light absorption layer to absorb the invisible light, and multiple white resin layers including a white resin layer and other white resin layers, the invisible light absorption layer, the other white resin layers, and the white resin layer are disposed in this order in the light incident direction. The white resin layer has visible light resistance higher than the visible light resistance of the other resin layers.

Second Aspect

In the reading device according to the first aspect, the multiple white resin layers include a first white resin layer that adheres to a base member, and a second white resin layer, the base member, the first white resin layer, and the second white resin layer are disposed in this order in the light incident direction.

Third Aspect

In the reading device according to the second aspect, the second white resin layer has a visible light resistance higher than the visible light resistance of the first white resin layer.

Fourth Aspect

In the reading device according to the second aspect, the second white resin layer has a visible light reflectance higher than the visible light reflectance of the first white resin layer.

Fifth Aspect

In the reading device according to the first aspect, the multiple white resin layer include a first white resin layer and a second white resin layer including a base member. The second white resin layer and the first white resin layer are disposed in this order in the light incident direction.

Sixth Aspect

In the reading device according to the fifth aspect, the second white resin layer has a visible light resistance higher than the visible light resistance of the first white resin layer.

Seventh Aspect

In the reading device according to the fifth aspect, the second white resin layer has a visible light reflectance higher than the visible light resistance of the first resin layer.

Eighth Aspect

In the reading device according to any one of the first to seventh aspects, an anti-yellowing agent is added to the invisible resin layer or the multiple white resin layers.

Ninth Aspect

The reading device according to any one of the first to eighth aspects further includes an image processing unit to detect a feature amount of the subject or the background member from at least one of the visible image or the invisible image.

Tenth Aspect

In the reading device according to the ninth aspect, the image processing unit detects an edge between the subject and the background member as the feature amount of the visible image or the invisible image.

Eleventh Aspect

In the reading device according to any one of the first to tenth aspects, the illumination unit irradiates the subject with infrared light as the invisible light, the imaging unit takes an infrared image as the invisible image, and the invisible light absorption layer includes an infrared light absorber as an absorption component.

Twelfth Aspect

In the reading device according to any one of the first to eleventh aspects, the subject includes a package.

Thirteenth Aspect

An image processing apparatus includes the image reading device according to any one of the first to twelfth aspects, and an image forming unit.

Fourteenth Aspect

A reading method is for a reading device that includes an illumination unit to irradiate a subject with visible light and invisible light in a light incident direction, an imaging unit to receive the visible light and the invisible light reflected from the subject and to take a visible image and an invisible image, and a background member that is disposed at an imaging region of the imaging unit and reflects at least the visible light. The background member includes an invisible light absorption layer to absorb the invisible light, multiple white resin layers including a white resin layer and other white resin layers. The invisible light absorption layer, the other white resin layers, and the white resin layer are disposed in this order in the light incident direction. The white resin layer has a visible light resistance higher than the other resin layers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

The invention claimed is:

1. A reading device comprising:
a light source to irradiate a subject with visible light and invisible light in a light incident direction;
an imager to:
receive the visible light and the invisible light reflected from the subject; and
image a visible image and an invisible image; and
a background member disposed at an imaging region of the imager to reflect at least the visible light, the background member including:
a first white resin layer; and
a second white resin layer on the first white resin layer, the second white resin layer having a visible light resistance higher than the first white resin layer; and
an invisible light absorption layer on the second white resin layer, the invisible light absorption layer absorbable the invisible light, and
the invisible light absorption layer, the second white resin layer, and the first white resin layer are disposed in this order in the light incident direction.

2. The reading device according to claim 1, further comprising a base member disposed downstream of the first white resin layer in the light incident direction.

3. The reading device according to claim 1,
wherein the background member includes multiple white resin layers,
the second white resin layer is disposed at an uppermost layer among the multiple white resin layers in the light incident direction and has a highest light resistance among the multiple white resin layers.

4. The reading device according to claim 1,
wherein the second white resin layer has a visible light reflectance higher than the first white resin layer.

5. The reading device according to claim 1,
wherein the background member includes multiple white resin layers, and the first white resin layer is disposed at a lowermost layer among the multiple white resin layers in the light incident direction.

6. The reading device according to claim 1,
wherein an anti-yellowing agent is added to at least one of the invisible light absorption layer, the first white resin layer, or the second white resin layer.

7. The reading device according to claim 1, further comprising
circuitry configured to detect a feature amount of the subject or the background member from at least one of the visible image or the invisible image.

8. The reading device according to claim 7,
wherein the circuitry is configured to detect an edge between the subject and the background member as the feature amount of the visible image or the invisible image.

9. The reading device according to claim 1,
wherein the light source irradiates the subject with infrared light as the invisible light,
the imager images an infrared image as the invisible image; and
the invisible light absorption layer includes an infrared light absorber as an absorption component.

10. The reading device according to claim 1,
wherein the subject includes a package.

11. An image processing apparatus comprising:
the image reading device according to claim 1; and
an image forming unit.

12. A reading method comprising:
irradiating a subject and a background member with visible light and invisible light from a light source in a light incident direction, the background member including:
- a first white resin layer;
- a second white resin layer on the first white resin layer, the second white resin layer having a visible light resistance higher than the first white resin layer; and
- an invisible light absorption layer on the second white resin layer, the invisible light absorption layer absorbable the invisible light, and
- the invisible light absorption layer, the second white resin layer, and the first white resin layer being disposed in this order in the light incident direction;

imaging a visible image and an invisible image from the visible light and the invisible light reflected by the subject and the background member; and detecting a feature amount of the subject or the background member from at least one of the visible image or the invisible image.

* * * * *